US012729076B2

(12) United States Patent
Janoušek et al.

(10) Patent No.: US 12,729,076 B2
(45) Date of Patent: Sep. 8, 2026

(54) APPARATUS FOR CONVEYING POLYOLEFIN PARTICLES

(71) Applicant: JSP International SARL, Estrees St. Denis (FR)

(72) Inventors: Jan Janoušek, Estrees St. Denis (FR); Pascal Dzikowski, Estrees St. Denis (FR); Mirjam Martina Lucht, Burgbernheim (DE); Jörg Vetter, Münster (DE)

(73) Assignee: JSP International Sarl (FR)

( * ) Notice: Subject to any disclaimer, the term of this patent is extended or adjusted under 35 U.S.C. 154(b) by 0 days.

(21) Appl. No.: 18/727,266

(22) PCT Filed: Dec. 23, 2022

(86) PCT No.: PCT/EP2022/087720
§ 371 (c)(1),
(2) Date: Jul. 8, 2024

(87) PCT Pub. No.: WO2023/131557
PCT Pub. Date: Jul. 13, 2023

(65) Prior Publication Data

US 2025/0091818 A1 Mar. 20, 2025

(30) Foreign Application Priority Data

Jan. 10, 2022 (EP) .................................... 22150680

(51) Int. Cl.
*B65G 53/20* (2006.01)
*B65G 53/66* (2006.01)

(52) U.S. Cl.
CPC ............ *B65G 53/20* (2013.01); *B65G 53/66* (2013.01)

(58) Field of Classification Search
CPC ........... B65G 53/06–22; B65G 53/528; B65G 53/60; B01J 2208/00778
See application file for complete search history.

(56) References Cited

U.S. PATENT DOCUMENTS 1,355,444 A * 10/1920 Baxter ...................... F23K 3/00 406/56
3,297,466 A * 1/1967 Herman .................. C08F 10/00 427/212

(Continued)

FOREIGN PATENT DOCUMENTS

CN 209418641 9/2019
WO 2019201723 10/2019

OTHER PUBLICATIONS

Melendy, Kevin "What is Pneumatic Conveying and How do These Systems Work" (2021), pp. 1-5, XP055919282, URL: https://www.pneumaticconveyingsolutions.com/blog/what-is-pneumatic-conveying-.

*Primary Examiner* — Joseph A Dillon, Jr.
(74) *Attorney, Agent, or Firm* — Rimon PC

(57) ABSTRACT

An apparatus (1) for conveying polyolefin particles, particularly foamed polyolefin particles, from a first location (L1) to a second location (L2), the apparatus (1) comprising:

Figure 1:
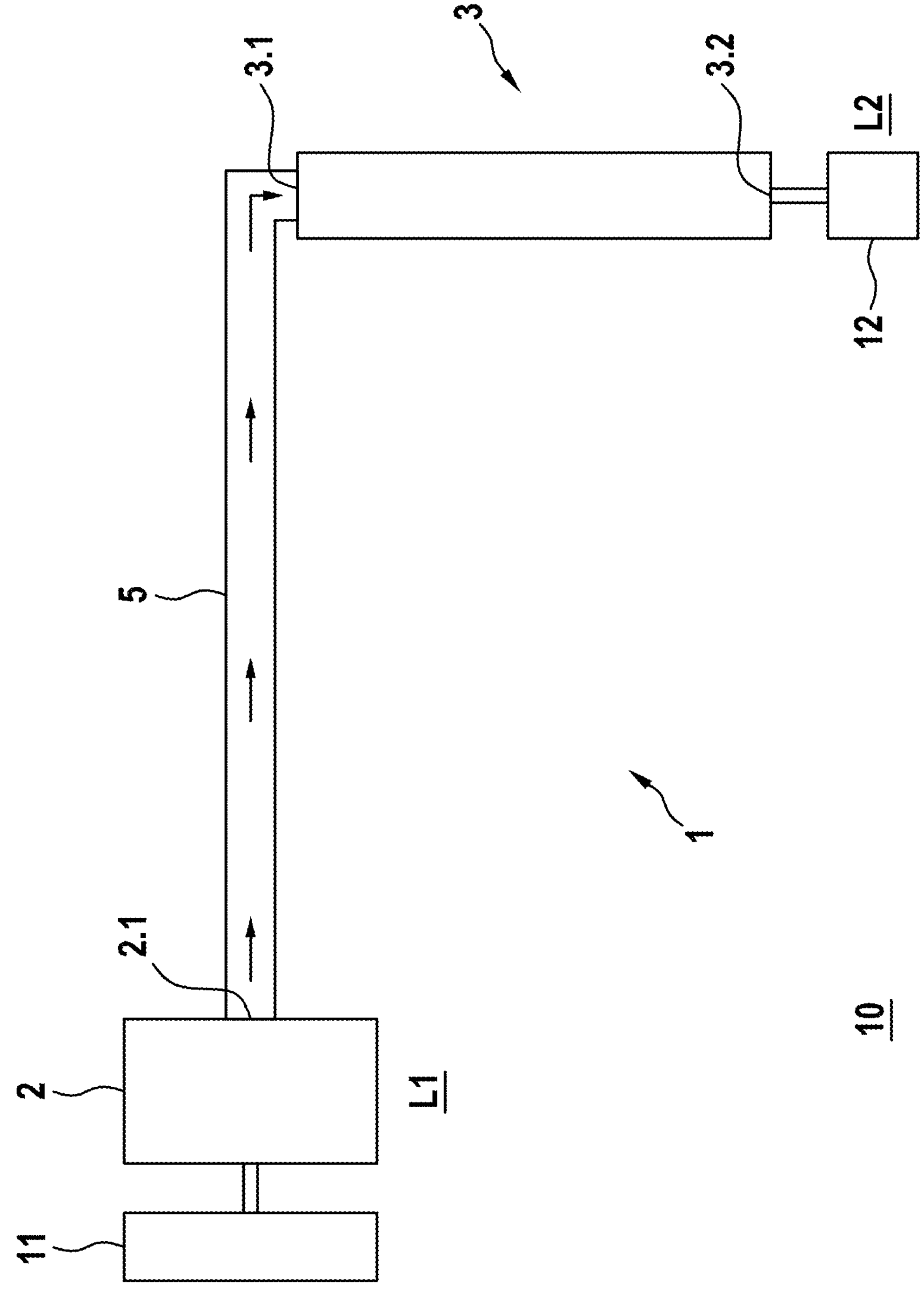

- a pressurizing unit (2) for generating a pressurized particle conveying fluid stream, particularly comprising polyolefin particles in a pressurized fluid, the pressurized particle conveying fluid stream having a first pressure level;
- a decompressing unit (3) for decompressing the pressurized particle conveying fluid stream from the first pressure level to generate a decompressed particle conveying fluid stream having a second pressure level, wherein the decompressing unit (3) comprises:

(Continued)

a first chamber (6) for receiving the pressurized particle conveying fluid stream and a second chamber (7) surrounding the first chamber (6), wherein the first chamber (6) is delimited by a first wall structure (6.1) and the second chamber (7) is delimited by a second wall structure (7.1); wherein
the first wall structure comprises (6.1) at least one first opening (6.1.1) through which an inner volume of the first chamber (6) is connected with an inner volume of the second chamber (7) and the second wall structure (7.1) comprises at least one second opening (7.1) through which the inner volume of the second chamber (7) is connectable or connected with at least one dampening device (8).

20 Claims, 3 Drawing Sheets

(56) References Cited

U.S. PATENT DOCUMENTS 3,436,344 A * 4/1969 Rooney .................. C01B 32/36 127/55
3,992,282 A * 11/1976 Grosboll ................ B01J 8/0278 208/143
4,082,366 A * 4/1978 Duff ........................ B01J 3/02 406/76
4,198,860 A * 4/1980 King ...................... G01F 1/363 73/195
5,160,513 A * 11/1992 Koves ............... B01D 53/0446 55/443
5,657,704 A * 8/1997 Schueler ................ C21B 5/003 110/106
6,648,558 B1 * 11/2003 Shultz ................... B65G 53/12 406/154
7,524,904 B2 * 4/2009 Verser .................... C08F 6/003 526/918
7,534,341 B2 * 5/2009 Karer ....................... B01J 4/007 208/152
7,648,566 B2 * 1/2010 Wei ......................... C01B 3/501 422/235
7,790,840 B2 9/2010 Roger et al.
7,871,460 B2 * 1/2011 Wardle .................. B01D 53/08 96/123
8,268,271 B2 * 9/2012 Daugaard ........... B01D 53/885 95/107
8,882,400 B2 * 11/2014 Leininger .............. F23N 1/002 198/642
8,950,570 B2 * 2/2015 Bielenberg ............... F23K 3/00 406/102
9,011,561 B2 * 4/2015 Chandran ................ C10J 3/466 48/77
9,228,032 B2 * 1/2016 Chamayou ............ B01J 8/0055
2007/0037935 A1 * 2/2007 Karer ....................... B01J 4/002 422/131
2011/0305611 A1 * 12/2011 Freeman ............. B01J 19/2485 422/171
2012/0042957 A1 * 2/2012 Turner .................... B01D 7/02 137/1
2012/0111109 A1 * 5/2012 Chandran ............. B01J 8/0055 73/32 R
2016/0199774 A1 * 7/2016 Grave ..................... C10L 3/103 95/149
2021/0053019 A1 2/2021 Laurell et al.
2021/0316241 A1 * 10/2021 Scaife .................... B01D 45/16
2022/0250002 A1 * 8/2022 Moore ............... B01D 53/1475
2024/0209171 A1 * 6/2024 Dzikowski ................. C08J 9/12
2024/0227254 A1 * 7/2024 Vetter ...................... C08J 9/141
2024/0227255 A1 * 7/2024 Vetter ................. B29C 44/3453
2025/0100815 A1 * 3/2025 Lucht ..................... B65G 53/66

* cited by examiner

Fig. 2

APPARATUS FOR CONVEYING POLYOLEFIN PARTICLES

The invention refers to an apparatus for conveying polyolefin particles, particularly cellular or foamed polyolefin particles, from a first location to a second location.

Respective apparatuses for conveying polyolefin particles are generally known from the field of polyolefin processing and generally enable conveying polyolefin particles from a first location to a second location. An exemplary first location can be a first polyolefin processing site, such as e.g. a polyolefin particle production site, an exemplary second location can be a second polyolefin processing site, such as e.g. a polyolefin particle testing site, a polyolefin particle packaging site, or a polyolefin part manufacturing site.

Hitherto, it is common that conveying polyolefin particles comprises conveying the polyolefin particles in a pressurized fluid stream, such as a pressurized gas stream. Hence, the particles are typically conveyed in a pressurized fluid stream and thus, after being conveyed from a respective first location to a respective second location, need to be decompressed or depressurized at the second location.

Yet, depressurizing is a challenge and the principles known from prior art are oftentimes technically immature with respect to the decompression or depressurization of the polyolefin particles such that there exists a need for an improved principle of decompression or depressurization of respective polyolefin particles.

It is therefore, an objective of the present invention to provide an apparatus for conveying polyolefin particles from a first location to a second location which enables an improved decompression or depressurization of polyolefin particles contained within a pressurized fluid.

A first aspect of the invention relates to an apparatus for conveying polyolefin particles, particularly cellular or foamed polyolefin particles, i.e. polyolefin particles having a cellular or foamed structure, from a first location to a second location. The expression "polyolefin particles" generally refers to polyolefin polymer particles based on or including one or more polyolefin polymer materials such as polyethylene and/or polypropylene, for instance. Respective polyolefin materials may comprise mixtures of two or more (chemically) different polyolefins such that the expression "polyolefin particles" generally also includes polyolefin mixtures, polyolefin copolymers, etc. The apparatus is thus, configured to convey respective polyolefin particles from a first location to a second location. An exemplary first location can be a first polyolefin processing site, such as e.g. a polyolefin particle production site, an exemplary second location can be a second polyolefin processing site, such as e.g. a polyolefin particle testing site, a polyolefin particle packaging site, a polyolefin part manufacturing site, etc. At least one of the first and second location can also be a particle storage device, e.g. a tank, for storing polyolefin particles.

The apparatus comprises a pressurizing unit and a decompression or depressurizing unit whose function and structure will be specified in the following:

The pressurizing unit is configured to generate a pressurized particle conveying fluid stream. The pressurized particle conveying fluid stream typically, comprises polyolefin particles in a pressurized fluid. The pressurized fluid can be a gas. The gas can e.g. be air or an inert gas, such as Argon, Helium, $CO_2$, etc. The pressurized particle conveying fluid stream has a first pressure level. The first pressure level can range between 1 bar and 1000 bar, for instance. The first pressure level can thus, be 1 bar, 2 bar, 3 bar, 4 bar, 5 bar, 6 bar, 7 bar, 8 bar, 9 bar, 10 bar, 11 bar, 12 bar, 13 bar, 14 bar, 15 bar, 16 bar, 17 bar, 18 bar, 19 bar, 20 bar, 21 bar, 22 bar, 23 bar, 24 bar, 25 bar, 26 bar, 27 bar, 28 bar, 29 bar, 30 bar, 31 bar, 32 bar, 33 bar, 34 bar, 35 bar, 36 bar, 37 bar, 38 bar, 39 bar, 40 bar, 41 bar, 42 bar, 43 bar, 44 bar, 45 bar, 46 bar, 47 bar, 48 bar, 49 bar, 50 bar, 51 bar, 52 bar, 53 bar, 54 bar, 55 bar, 56 bar, 57 bar, 58 bar, 59 bar, 60 bar, 61 bar, 62 bar, 63 bar, 64 bar, 65 bar, 66 bar, 67 bar, 68 bar, 69 bar, 70 bar, 71 bar, 72 bar, 73 bar, 74 bar, 75 bar, 76 bar, 77 bar, 78 bar, 79 bar, 80 bar, 81 bar, 82 bar, 83 bar, 84 bar, 85 bar, 86 bar, 87 bar, 88 bar, 89 bar, 90 bar, 91 bar, 92 bar, 93 bar, 94 bar, 95 bar, 96 bar, 97 bar, 98 bar, 99 bar, 100 bar. Each of the aforementioned exemplary values can also be deemed a lower or upper threshold value of a pressure range of the pressurized particle conveying fluid stream. The aforementioned exemplary pressure levels/values typically, refer to absolute pressure levels/values. The aforementioned pressure levels/values can also be used as threshold values of pressure level intervals.

The decompressing unit is configured to decompress the pressurized particle conveying fluid stream from the first pressure level to a second pressure level lower than the first pressure level. The decompressing unit is thus, configured to generate a decompressed particle conveying fluid stream having a second pressure level lower than the first pressure level. Hence, decompression comprises reducing the pressure level of the pressurized particle conveying fluid stream from the first pressure level to the second pressure level. The second pressure level can be atmospheric pressure, lower than atmospheric pressure, or higher than atmospheric pressure with the premise that it is below the first pressure level. As such, the particles can be conveyed by gravity forces and/or conveying fluids after decompressing the pressurized particle conveying fluid stream.

The pressurizing unit and the decompressing unit are typically, connected via suitable connecting means, such as tubes, hoses, pipes etc., which enable that the pressurized particle conveying fluid stream can stream from the pressurizing unit, i.e. particularly an outlet opening of the pressurizing unit, to the decompressing unit, i.e. particularly an inlet opening of the decompressing unit. As such, the apparatus can comprise a connecting unit comprising at least one connecting element, such as a tube, hose, pipe, etc., connecting the pressurizing unit with the decompressing unit. The decompressing unit is typically, arranged downstream of the pressurizing unit.

The decompressing unit comprises a first chamber and a second chamber.

The first chamber is configured to receive the pressurized particle conveying fluid stream. The first chamber can comprise an inlet opening of the decompressing unit or can at least directly or indirectly communicate with an inlet opening of the decompressing unit. The first chamber can have a hollow-cylindrical basic shape which defines a central axis of the first chamber. Particularly, the first chamber can be built from at least one duct- or pipe-element. The first chamber can thus, comprise a duct- or pipe-like shape. The first chamber is thus, scalable by choosing appropriate duct- or pipe-elements. In either case, the first chamber comprises or is delimited by a first wall structure which defines or delimits a first volume which represents the (inner) volume of the first chamber. According to a concrete example, the first chamber can thus, be generally configured as a tube or a pipe, for instance.

The second chamber surrounds the first chamber. The second chamber can also have a hollow-cylindrical basic shape which defines a central axis of the second chamber.

Particularly, the second chamber can be built from at least one duct- or pipe-element. The second chamber can thus, comprise a duct- or pipe-like shape. The second chamber is thus, scalable by choosing appropriate duct- or pipe-elements. In either case, the second chamber comprises or is delimited by a second wall structure which defines or delimits a second volume which represents the (inner) volume of the second chamber. According to a concrete example, the first chamber and the second chamber can thus, be coaxially arranged. The dimensions, i.e. particularly the inner diameter, of the second chamber are typically larger than the dimensions, i.e. particularly the outer diameter, of the first chamber such that the second chamber can thus, surround the first chamber. The first chamber can thus, be accommodated in the (inner) volume of the second chamber.

The first and second chambers can be arranged with an angle, e.g. with an angle of 90°, relative to a horizontal reference plane, e.g. defined by a ground. Particularly, the first and second chambers can be vertically arranged with their respective central axes being oriented approx. 90° relative to a respective horizontal reference plane. Thus, the particles can be conveyed through the decompressing unit, i.e. particularly through the first camber, e.g. by gravity forces after decompressing the pressurized particle conveying fluid stream as explained above.

As indicated above, the first chamber is delimited by a first wall structure and the second chamber is delimited by a second wall structure. The first wall structure comprises at least one first opening through which an inner volume of the first chamber (i.e. the first volume) is connected with an inner volume of the second chamber (i.e. the second volume) and the second wall structure comprises at least one second opening through which the inner volume of the second chamber (i.e. the second volume) can be connected with at least one dampening device (if present).

Hence, the decompressing unit comprises a specific fluid communication arrangement of the first chamber and the second chamber. Specifically, the first chamber and the second chamber are in fluid communication, which enables that a fluid inside the first chamber can, particularly radially, enter the second chamber from the first chamber through the at least one first opening provided with the first wall structure.

The dimensions of the at least one first opening is typically, small enough to impede that polyolefin particles within the pressurized particle conveying fluid stream can enter the second chamber. Hence, the dimensions of the at least one first opening is typically, at least smaller than the minimum particle size or the mean average particle size of the polyolefin particles within the pressurized particle conveying fluid stream. The first wall structure thus, acts as a separation or screening, or sieving means configured to separate, screen, or sieve the polyolefin particles within the pressurized particle conveying fluid stream from the pressurized particle conveying fluid stream while the pressurized particle conveying fluid stream is decompressed at the same time.

The configuration of the decompressing unit enables decompressing polyolefin particles without causing damage to the polyolefin particles. Particularly, no visually perceivable damage is caused to the polyolefin particles.

As such, a highly effective and practical way of decompressing a respective pressurized particle conveying fluid stream is implemented.

The decompressing unit can further comprise at least one dampening device. The at least one dampening device is configured to dampen noise generated through decompressing of the pressurized particle conveying fluid stream via the decompressing unit. The at least one dampening device can comprise a housing having an inner space including a noise dampening structure, e.g. a baffle structure, for dampening noise generated through decompressing of the pressurized particle conveying fluid stream via the decompressing unit. The noise dampening structure can comprise a multi-dimensional arrangement of baffle elements which are positioned and/or oriented to dampen respective noise. The housing can comprise an inlet for a fluid stream entering the at least one dampening device and an outlet for a fluid stream exiting the dampening device. The noise dampening structure is arranged or formed between the inlet and the outlet. The at least one dampening device can thus, be formed as a sound suppressor device.

The second chamber and the at least one dampening device (if present), i.e. particularly a respective inner space of the at least one dampening device which includes a dampening structure, can be in fluid communication, which enables that a fluid inside the second chamber, e.g. a fluid which has entered the second chamber through the at least one first opening, can, particularly radially, enter the inner space of the at least one dampening device from the second chamber through the at least one second opening provided with the second wall structure.

According to an exemplary embodiment, the first chamber can comprise at least one inlet opening for the pressurized particle conveying fluid stream and at least one outlet opening for the decompressed particle conveying fluid stream.

At least one inlet control device can be assigned to the at least one inlet opening of the first chamber. The at least one inlet control device is configured to control an amount of pressurized particle conveying fluid stream to enter the first chamber via the at least one inlet opening. Hence, exact control of the amount of pressurized particle conveying fluid stream to enter the first chamber via the at least one inlet opening can be determined by the at least one inlet control device.

The at least one inlet control device can comprise at least one shutter element moveably supported between at least two orientations and/or positions, wherein at least one first orientation and/or position corresponds to an open state of the at least one inlet control device in which an amount of pressurized particle conveying fluid stream can enter the first chamber via the at least one inlet opening, and at least one second orientation and/or position corresponds to a closed state of the at least one inlet control device in which an amount of pressurized particle conveying fluid stream cannot enter the first chamber via the at least one inlet opening. Operation of the at least one inlet control device, i.e. particularly motions of a respective shutter element between respective open and closed states, can be controlled by a hardware- and/or software-embodied control device of the inlet control device or by a superordinate hardware- and/or software-embodied control device of the decompressing unit or the apparatus, respectively.

According to a concrete exemplary embodiment, the at least one inlet control device can be built as or comprise at least one valve device. A respective valve device typically, comprises at least one valve element (shutter element) moveably supported between at least one open state at least one closed state as specified in context with the at least one inlet control device. A respective valve device can be connected with at least one actuating device for actuating a respective valve element to transfer the at least one valve element between a respective open and closed state and vice versa.

Likewise, at least one outlet control device can be assigned to the at least one outlet opening of the first chamber. The at least one outlet control device is configured to control an amount of decompressed particle conveying fluid stream and/or the amount of decompressed polyolefin particles to exit the first chamber via the at least one outlet opening. Hence, exact control of the amount of the decompressed particle conveying fluid stream and/or the amount of decompressed polyolefin particles to exit the first chamber via the at least one outlet opening can be determined by the at least one outlet control device. The at least one outlet control device can comprise at least one shutter element moveably supported between at least two orientations and/or positions, wherein at least one first orientation and/or position corresponds to an open state of the at least one outlet control device in which an amount of decompressed particle conveying fluid stream can exit the first chamber via the at least one outlet opening, and at least one second orientation and/or position corresponds to a closed state of the at least one outlet control device in which an amount of decompressed particle conveying fluid stream cannot exit the first chamber via the at least one outlet opening. Operation of the at least one outlet control device, i.e. particularly motions of a respective shutter element between respective open and closed states, can be controlled by a hardware- and/or software-embodied control device of the outlet control device or by a superordinate hardware- and/or software-embodied control device of the decompressing unit or the apparatus, respectively.

According to a concrete exemplary embodiment, the at least one the outlet control device can be built as or comprise at least one valve device. A respective valve device typically, comprises at least one valve element (shutter element) moveably supported between at least one open state at least one closed state as specified in context with the at least one outlet control device. A respective valve device can be connected with at least one actuating device for actuating a respective valve element to transfer the at least one valve element between a respective open and closed state and vice versa.

Operation of the at least one inlet control device and the at least one outlet control device is typically, synchronized via respective hardware- and/or software-embodied control devices of the at least one inlet control device and the at least one outlet control device or via a superordinate hardware- and/or software-embodied control device of the decompressing unit or the apparatus, respectively. Specifically, when transferring the at least one inlet control device in its open state, the at least one outlet control device has been previously transferred in its closed state and vice versa. In other words, transferring the at least one inlet control device in the open state typically, takes place when the at least one outlet control device is in the closed state and vice versa. Hence, synchronizing typically, means that the at least one inlet control device and the at least one outlet control are never in their respective open state and/or closed state at the same time.

According to a further exemplary embodiment, the first wall structure delimiting the first chamber can comprise not only one, but a plurality of first openings forming a mesh or screen structure. The openings can generally have bore- or slit-like shapes. Yet, as mentioned above, the dimensions of the openings typically, impede that polyolefin particles within the pressurized particle conveying fluid stream can enter the second chamber.

According to a further exemplary embodiment, one, a plurality of, or all first openings can have varying dimensions, particularly a varying cross-section, between an inlet portion through which a particle conveying fluid stream enters the at least one opening from the first chamber to an outlet portion through which a particle conveying fluid stream exits the at least one opening into the second chamber. Hence, the wall portions of the first wall structure delimiting the at least one first opening can be inclined relative to a central axis of the first chamber, particularly relative to an auxiliary axis radially extending off the central axis of the first chamber.

According to a further exemplary embodiment, the first wall structure delimiting the first chamber is built from or comprises a wire wrapped mesh or a wire wrapped screen. A respective wire wrapped mesh or a wire wrapped screen can have a hollow-cylindrical shape which also defines the hollow-cylindrical basic shape of the first chamber. Respective wire wrapped mesh or a wire wrapped screen enable a cost-effective and highly efficient separation of polyolefin particles from a respective pressurized particle conveying fluid stream.

According to a further exemplary embodiment, the decompressing unit can comprise a plurality of respective dampening devices located at different positions, e.g. at different axial and/or radial and/or circumferential positions, relative to the circumferential and/or longitudinal extension of the decompressing unit. As an example, the decompressing unit can comprise a plurality of dampening devices arranged at different positions relative to the circumferential and/or longitudinal extension of the decompressing unit, for instance. Arranging respective dampening devices at different axial and/or radial and/or circumferential positions enables a more homogenous decompression. By increasing the number of dampening devices, the dampening efficiency can be increased. Generally, at least two dampening devices can differ in their dampening properties, e.g. due to different dampening structure designs.

At least two dampening devices disposed at the same axial position, yet at different circumferentially positions, e.g. at opposing circumferential positions, can form a dampening group or dampening stage, respectively. The decompressing unit can comprise a plurality of such dampening groups or dampening stages at different axial positions. Respective dampening stages can comprise the same number or a different number of dampening devices.

According to a further exemplary embodiment, the apparatus can comprise a cleaning fluid stream generating unit for generating a pressurized cleaning fluid stream for cleaning the decompressing unit from residue polyolefin particles. The cleaning stream particularly, serves for cleaning the first chamber from particle residues which have not been removed through a respective outlet opening of the first chamber. Likewise, the cleaning stream can serve for cleaning respective connecting means connecting the pressurizing unit and the decompressing unit. The cleaning fluid stream generating unit can be identical with the pressurizing unit. As such, the pressurizing unit can also be configured to generate a respective cleaning fluid stream which does not comprise polyolefin particles to be conveyed. The cleaning fluid stream can also be a gas stream, such as an air stream or an inert gas stream.

By generating a pressurized cleaning fluid stream for cleaning the decompressing unit from residue polyolefin particles, the apparatus can be operated in a cleaning mode in which residue polyolefin particles can be removed from the decompressing unit. In a respective cleaning mode, operation of the at least one inlet control device and the at least one outlet control device is typically, synchronized via respective hardware- and/or software-embodied control device of the at least one inlet control device and the at least one outlet control device or via a superordinate hardware- and/or software-embodied control device of the decompressing unit or the apparatus, respectively. Specifically, both the at least one inlet control device and the at least one outlet control device are transferred in their respective open state. Hence, synchronizing in the cleaning mode typically, means that the at least one inlet control device and the at least one outlet control device are both in their respective open state at the same time.

A respective cleaning mode can be initiated with a master key, e.g. a mechanical master key, configured to initiate a controlled synchronization of the at least one inlet control device and the at least one outlet control device such that they are transferred in their respective open state.

According to a further embodiment, the apparatus can comprise a support structure for supporting at least the decompressing unit in a desired orientation and/or position. As an example, a respective support structure can support at least the decompressing unit in a vertical orientation and/or position, i.e. particularly an orientation and/or position in which the first and second chambers are vertically arranged with their respective central axes being oriented approx. 90° relative a horizontal reference plane relative to a ground.

According to a further exemplary embodiment, the first and second chamber can build a column-like chamber arrangement.

According to a further exemplary embodiment, at least the first and second chamber can be arranged in a housing structure of the apparatus. Arranging at least the first and second chamber in a housing structure can protect them e.g. from environmental influences.

A second aspect of the invention relates to a decompressing unit for an apparatus according to the first aspect of the invention. The decompressing unit comprises a first chamber for receiving the pressurized particle conveying fluid stream and a second chamber surrounding the first chamber, wherein the first chamber is delimited by a first wall structure and the second chamber is delimited by a second wall structure; wherein the first wall structure comprises at least one first opening through which an inner volume of the first chamber is connected with an inner volume of the second chamber and the second wall structure comprises at least one second opening through which the inner volume of the second chamber can be connected with at least one dampening device (if present). All annotations regarding the apparatus according to the first aspect of the invention also apply to the decompressing unit according to the second aspect of the invention.

A third aspect of the invention relates to a system for processing polyolefin particles, particularly for post-processing of polyolefin particles. The system comprises at least one storage apparatus for storing polyolefin particles to be processed via at least one processing apparatus, such as a molding apparatus for molding a polyolefin part, at least one processing apparatus for processing polyolefin particles, and at least one apparatus according to the first aspect of the invention. All annotations regarding the apparatus according to the first aspect of the invention also apply to the system according to the third aspect of the invention.

A fourth aspect of the invention relates to a method for conveying polyolefin particles from a first location to a second location. The method comprises the steps of: generating, via a pressurizing unit, a particle conveying fluid stream, particularly comprising polyolefin particles in a pressurized fluid, the pressurized particle conveying fluid stream having a first pressure level; and decompressing, via a decompressing unit, the pressurized particle conveying fluid stream from the first pressure level to generate a decompressed particle conveying fluid stream having a second pressure level. The decompressing unit used in the method comprises a first chamber for receiving the pressurized particle conveying fluid stream and a second chamber surrounding the first chamber, wherein the first chamber is delimited by a first wall structure and the second chamber is delimited by a second wall structure; wherein the first wall structure comprises at least one first opening through which an inner volume of the first chamber is connected with an inner volume of the second chamber and the second wall structure comprises at least one second opening through which the inner volume of the second chamber can be connected with at least one dampening device (if present). All annotations regarding the apparatus according to the first aspect of the invention also apply to the method according to the fourth aspect of the invention.

Figure 3:
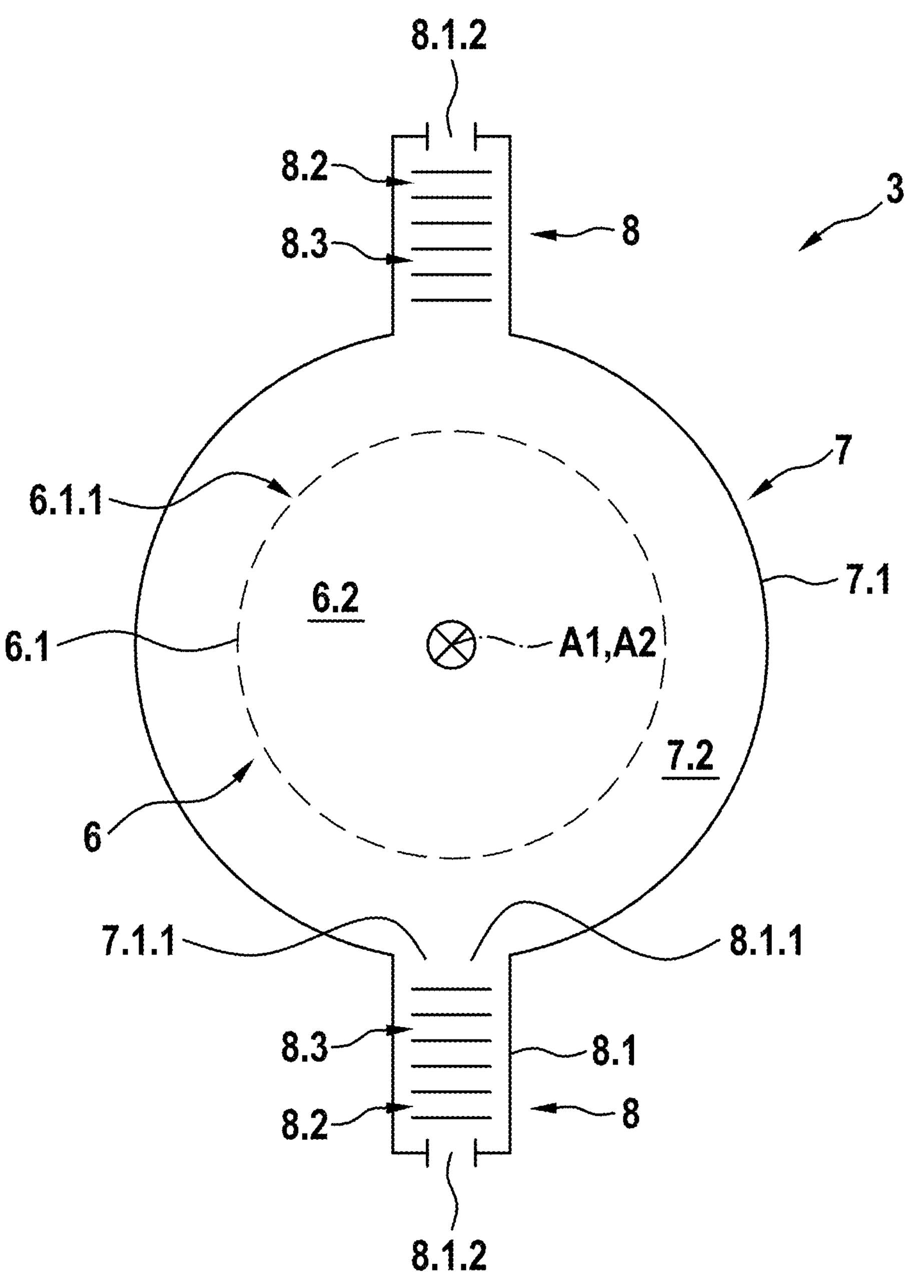

The invention is further specified in accordance with the attached drawings, which comprise:

FIG. 1 showing a principle drawing of an apparatus for conveying polyolefin particles according to an exemplary embodiment;

Figure 2:
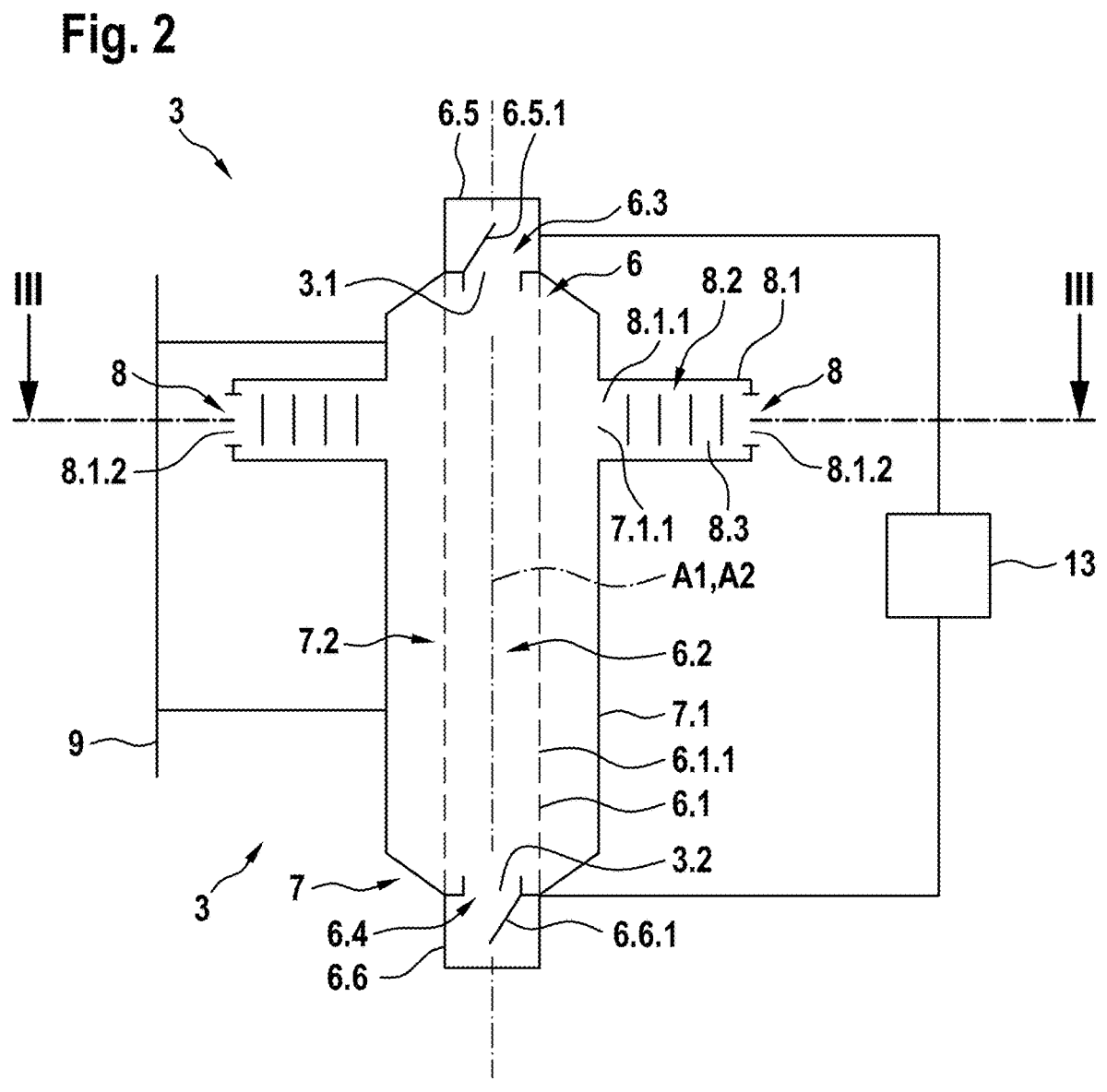

FIG. 2 showing a principle drawing of a decompressing unit according to an exemplary embodiment;

FIG. 3 showing a cross-sectional cut view of the decompressing unit of FIG. 2.

FIG. 1 shows a principle drawing of an apparatus 1 for conveying polyolefin particles according to an exemplary embodiment. The apparatus 1 is configured to convey respective polyolefin particles from a first location L1 to a second location L2. An exemplary first location L1 can be a first polyolefin processing site, such as e.g. a polyolefin particle production site, an exemplary second location L2 can be a second polyolefin processing site, such as e.g. a polyolefin particle testing site, a polyolefin particle packaging site, a polyolefin part manufacturing site, etc. At least one of the first and second location L1, L2 can also be a particle storage device, e.g. a tank, for storing polyolefin particles.

The apparatus 1 comprises a pressurizing unit 2 and a decompressing unit 3 arranged downstream of the pressurizing unit 2.

The pressurizing unit 2 is configured to generate a pressurized particle conveying fluid stream (schematically indicated by arrows 4 in FIG. 1). The pressurized particle conveying fluid stream comprises polyolefin particles in a pressurized fluid. The pressurized fluid can be a gas. The gas can e.g. be air or an inert gas, such as Argon, Helium, $CO_2$, etc. The pressurized particle conveying fluid stream has a first pressure level. The first pressure level can range between 1 bar and 100 bar, particularly between 1 bar and 50 bar, more particularly between 1 and 20 bar, (absolute pressure).

The decompressing unit 3 is configured to decompress the pressurized particle conveying fluid stream from the first pressure level to a second pressure level lower than the first pressure level. The decompressing unit 3 is thus, configured to generate a decompressed particle conveying fluid stream having a second pressure level lower than the first pressure level. Hence, decompression comprises reducing the pressure level of the pressurized particle conveying fluid stream from the first pressure level to the second pressure level. The second pressure level can be atmospheric pressure, lower atmospheric pressure, or higher atmospheric pressure with the premise that the second pressure level is below the first pressure level. As such, the particles can be conveyed by gravity forces and/or conveying fluids after decompressing the pressurized particle conveying fluid stream.

As is apparent from FIG. 1, the pressurizing unit 2 and the decompressing unit 3 are connected via suitable connecting means 5, such as tubes, hoses, pipes etc., which enable that the pressurized particle conveying fluid stream can stream from the pressurizing unit 2, i.e. particularly an outlet opening 2.1 of the pressurizing unit 2, to the decompressing unit 3, i.e. particularly an inlet opening 3.1 of the decompressing unit 3.

FIG. 2 shows a principle drawing of a decompressing unit 3 according to an exemplary embodiment. FIG. 3 shows a cross-sectional cut view of the decompressing unit of FIG. 2 and provides insight on the internal structure of the decompressing unit 3.

As is particularly, apparent from FIGS. 2 and 3, the decompressing unit 3 comprises a first chamber 6, a second chamber 7, and a plurality of optional dampening devices 8.

The first chamber 6 is configured to receive the pressurized particle conveying fluid stream. The first chamber 6 comprises the inlet opening 3.1 of the decompressing unit 3 or can at least directly or indirectly communicate with the inlet opening 3.1 of the decompressing unit 3. The first chamber 6 can have a hollow-cylindrical basic shape which defines a central axis A1 of the first chamber 6. The first chamber 6 can be built from at least one duct- or pipe-element such that the first chamber 6 can comprise a duct- or pipe-like shape. The first chamber 6 is thus, scalable by choosing appropriate duct- or pipe-elements. In either case, the first chamber 6 comprises or is delimited by a first wall structure 6.1 which defines or delimits a first volume 6.2 which represents the inner volume of the first chamber 6.

As is particularly, apparent from FIG. 3, the second chamber 7 surrounds the first chamber 6. The second chamber 7 can also have a hollow-cylindrical basic shape which defines a central axis A2 of the second chamber 7. Notably, the central axis A2 of the second chamber 7 can be coincident with the central axis A1 of the first chamber 6 resulting in a coaxial arrangement (see e.g. FIG. 3). The second chamber 7 can be built from at least one duct- or pipe-element such that the second chamber 7 can comprise a duct- or pipe-like shape. The second chamber 7 is thus, scalable by choosing appropriate duct- or pipe-elements. In either case, the second chamber 7 comprises or is delimited by a second wall structure 7.1 which defines or delimits a second volume 7.2 which represents the inner volume of the second chamber 7.

FIG. 2 shows that the decompressing unit 3 can comprise a column-like chamber arrangement.

FIG. 3 shows the coaxial arrangement of the first and second chamber 6, 7 which is based on that the dimensions, i.e. particularly the inner diameter, of the second chamber 7 are larger than the dimensions, i.e. particularly the outer diameter, of the first chamber 6 such that the second chamber 7 can surround the first chamber 6. The first chamber 6 is thus, accommodated in the inner volume of the second chamber 7.

In the exemplary embodiments according to the Fig., the first and second chambers 6, 7 are arranged with an angle of approx. 90° relative to a horizontal reference plane P which can be defined by a ground. Particularly, the first and second chambers 6, 7 can be vertically arranged with their respective central axes A1, A2 being oriented approx. 90° relative to the horizontal reference plane P. Thus, the particles can be conveyed through the decompressing unit 3, i.e. particularly through the first camber 6, e.g. by gravity forces after decompressing the pressurized particle conveying fluid stream as explained above.

Each dampening device 8 is configured to dampen noise generated through decompressing of the pressurized particle conveying fluid stream via the decompressing unit 3. Each dampening device 8 can comprise a housing 8.1 having an inner space 8.2 including a noise dampening structure 8.3 (schematically indicated in FIG. 3), e.g. a baffle structure, for dampening noise generated through decompressing of the pressurized particle conveying fluid stream via the decompressing unit 3. The noise dampening structure 8.3 can comprise a multi-dimensional arrangement of baffle elements which are positioned and/or oriented to dampen respective noise. The housing 8.1 can comprise an inlet 8.1.1 for a fluid stream entering the dampening device 8 and an outlet 8.1.2 for a fluid stream exiting the dampening device 8. The noise dampening structure 8.3 is arranged or formed between the inlet 8.1.1 and the outlet 8.1.2. Each dampening device 8 can thus, be formed as a sound suppressor device.

As is apparent from FIG. 3, the first wall structure 6.1 comprises a plurality of first openings 6.1.1 through which the inner volume of the first chamber 6 (i.e. the first volume 6.2) is connected with the inner volume of the second chamber 7 (i.e. the second volume 7.2). As is also apparent from FIG. 3, the second wall structure 7.1 comprises a plurality of second openings 7.1.1 through which the inner volume of the second chamber 7 (i.e. the second volume 7.1) is connected with respective dampening devices 8.

Hence, the decompressing unit 3 comprises a specific fluid communication arrangement of the first chamber 6, the second chamber 7, and respective dampening devices 8. Specifically, the first chamber 6 and the second chamber 7 are in fluid communication via respective first openings 6.1.1, which enables that a fluid inside the first chamber 6 can enter the second chamber 7 from the first chamber 6 through the first openings 6.1.1 provided with the first wall structure 6.1. Further, the second chamber 7 and the dampening devices, i.e. particularly the respective inner space 8.2 including the dampening structure 8.3, are in fluid communication, which enables that a fluid inside the second chamber 7, e.g. a fluid which has entered the second chamber 7 through the first openings 6.1.1, can enter the inner space 8.2 of the dampening devices 8 from the second chamber 7 through the second openings 7.1.1 provided with the second wall structure 7.1.

The dimensions of the first openings 6.1.1 are typically, small enough to impede that polyolefin particles within the pressurized particle conveying fluid stream can enter the second chamber 7. Hence, the dimensions of the first openings are typically, at least smaller than the minimum particle size or the mean average particle size of the polyolefin particles within the pressurized particle conveying fluid stream. As an example, the dimensions of the first openings 6.1.1 can be below 1 mm, particularly below 0.5 mm, more particularly below 0.25 mm. The first wall structure 6.1 thus, acts as a separation or screening means configured to separate or screen the polyolefin particles within the pressurized particle conveying fluid stream from the pressurized particle conveying fluid stream while the pressurized particle conveying fluid stream is decompressed at the same time.

The first chamber 6 also comprises an inlet opening 6.3 for the pressurized particle conveying fluid stream and an outlet opening 6.4 for the decompressed particle conveying fluid stream. As is apparent from the Fig., the inlet opening 6.3 of the first chamber 6 also represents the inlet opening 3.1 of the decompressing unit 3 and the outlet opening 6.4 of the first chamber 6 also represents the outlet opening 3.2 of the decompressing unit 3.

An inlet control device 6.5 can be assigned to the inlet opening 6.3. The inlet control device 6.5 is configured to control an amount of pressurized particle conveying fluid stream to enter the first chamber 6 via the inlet opening 6.3. Hence, exact control of the amount of pressurized particle conveying fluid stream to enter the first chamber 6 via the inlet opening 6.3 can be determined by the inlet control device 6.5.

The inlet control device 6.5 comprises a shutter element 6.5.1 moveably supported between at least two orientations and/or positions, wherein at least one first orientation and/or position corresponds to an open state of the inlet control device 6.5 in which an amount of pressurized particle conveying fluid stream can enter the first chamber 6 via the inlet opening 6.3, and at least one second orientation and/or position corresponds to a closed state of the inlet control device 6.5 in which an amount of pressurized particle conveying fluid stream cannot enter the first chamber 6 via the inlet opening 6.3. Operation of the inlet control device 6.5, i.e. particularly motions of the shutter element 6.5.1 between respective open and closed states, can be controlled by a hardware- and/or software-embodied control device 13 of the decompressing unit 3 or the apparatus 1, respectively.

The inlet control device 6.5 can be built as or comprise at least one valve device which comprises at least one valve element (shutter element) moveably supported between at least one open state at least one closed state. The valve device can be connected with at least one actuating device (not shown) for actuating the valve element to transfer the valve element between a respective open and closed state and vice versa.

Likewise, an outlet control device 6.6 can be assigned to the outlet opening 6.4 of the first chamber 6. The outlet control 6.6 device is configured to control an amount of decompressed particle conveying fluid stream and/or the amount of decompressed polyolefin particles to exit the first chamber 6 via the outlet opening 6.4. Hence, exact control of the amount of decompressed particle conveying fluid stream and/or the amount of decompressed polyolefin particles to exit the first chamber 6 via the outlet opening 6.4 can be determined by the outlet control device 6.6. The outlet control device 6.6 can comprise a shutter element 6.6.1 moveably supported between at least two orientations and/or positions, wherein at least one first orientation and/or position corresponds to an open state of the outlet control device 6.6. in which an amount of decompressed particle conveying fluid stream can exit the first chamber 6 via the outlet opening 6.4, and at least one second orientation and/or position corresponds to a closed state of the outlet control device 6.6 in which an amount of decompressed particle conveying fluid stream cannot exit the first chamber 6 via the outlet opening 6.4. Operation of the outlet control device 6, i.e. particularly motions of the shutter element 6.6.1 between respective open and closed states, can be controlled by the hardware- and/or software-embodied control device 13 of the decompressing unit 3 or the apparatus 1, respectively.

The outlet control device 6.6 can be built as or comprise at least one valve device which comprises a valve element (shutter element) moveably supported between at least one open state at least one closed state. The valve device can be connected with at least one actuating device (not shown) for actuating the valve element to transfer the valve element between a respective open and closed state and vice versa.

Operation of the inlet control device 6.5 and the outlet control device 6.6 is synchronized via the control device 13. Specifically, when transferring the inlet control device 6.5 in its open state, the outlet control device 6.6 has been previously transferred in its closed state and vice versa. In other words, transferring the inlet control device 6.5 in the open state typically, takes place when the outlet control device 6.6 is in the closed state and vice versa. Hence, synchronizing means that the inlet control device 6.5 and the outlet control 6.6 are never in their respective open state and/or closed state at the same time.

The first wall structure 6.1 delimiting the first chamber 6 can be built from or comprise a wire wrapped mesh or a wire wrapped screen having a hollow-cylindrical shape which also defines the hollow-cylindrical basic shape of the first chamber 6. As such, the first openings 6.1.1 of the first wall structure 6.1 can have varying dimensions, particularly a varying cross-section, between an inlet portion through which a particle conveying fluid stream enters the respective opening 6.1.1 from the first chamber 6 to an outlet portion through which a particle conveying fluid stream exits the respective opening 6.1.1 into the second chamber 7. Hence, the wall portions of the first wall structure 6.1 delimiting the first openings 6.1.1 can be inclined an auxiliary axis radially extending off the central axis A1 of the first chamber 6.

As is apparent from FIGS. 2 and 3, the decompressing unit 3 can comprise a plurality of dampening devices 8 located at different positions, e.g. at different axial and/or radial and/or circumferential positions, relative to the circumferential and/or longitudinal extension of the decompressing unit which enables a more homogenous decompression.

As is apparent from FIGS. 2 and 3, at least two dampening devices 3 disposed at the same axial position, yet at different circumferentially positions, e.g. at opposing circumferential positions, can form a dampening group or dampening stage, respectively. The decompressing unit 3 can comprise a plurality of such dampening groups or dampening stages at different axial positions. Respective dampening stages can comprise the same number or a different number of dampening devices 8.

The apparatus 1 can comprise a cleaning fluid stream generating unit for generating a pressurized cleaning fluid stream for cleaning the decompressing unit 3 from residue polyolefin particles. The cleaning stream particularly, serves for cleaning the first chamber 6 from particle residues which have not been removed through a respective outlet opening 6.4 of the first chamber 6. Likewise, the cleaning stream can serve for cleaning respective connecting means connecting the pressurizing unit 2 and the decompressing unit 3. The cleaning fluid stream generating unit can be identical with the pressurizing unit 2. As such, the pressurizing unit 2 can also be configured to generate a respective cleaning fluid stream which does not comprise polyolefin particles to be conveyed. The cleaning fluid stream can also be a gas stream, such as an air stream or an inert gas stream.

By generating a pressurized cleaning fluid stream for cleaning the decompressing unit 3 from residue polyolefin particles, the apparatus 1 can be operated in a cleaning mode in which residue polyolefin particles can be removed from the decompressing unit 3. In a respective cleaning mode, operation of the inlet control device 6.5 and the outlet control device 6.6 is typically, synchronized via a respective hardware- and/or software-embodied control device of the inlet control device 6.5 and the outlet control device 6.6 or via a superordinate hardware- and/or software-embodied control device of the decompressing unit 3 or the apparatus 1, respectively. Specifically, both the inlet control device 6.5 and the outlet control device 6.6 are transferred in their respective open state. Hence, synchronizing in the cleaning mode typically, means that the inlet control device 6.5 and the outlet control device 6.6 are both in their respective open state at the same time.

A respective cleaning mode can be initiated with a master key, e.g. a mechanical master key, configured to initiate a controlled synchronization of the inlet control device 6.5 and the outlet control device 6.6 such that they are transferred in their respective open state.

FIG. 2 also shows that the apparatus 1 can comprise a support structure 9 for supporting at least the decompressing unit 3 in a desired orientation and/or position. As indicated in FIG. 2, a respective support structure 9 can support at least the decompressing unit 3 in a vertical orientation and/or position, i.e. particularly an orientation and/or position in which the first and second chambers 6, 7 are vertically arranged with their respective central axes A1, A2 being oriented approx. 90° relative a horizontal reference plane.

Even if not explicitly depicted in the Fig., at least the first and second chamber 6, 7 can be arranged in a housing structure of the apparatus 1 which can protect them e.g. from environmental influences.

The apparatus 1 can form part of a superordinate system 10 for processing polyolefin particles, particularly for post-processing of polyolefin particles. The system 10 comprises at least one storage apparatus 11 for storing polyolefin particles to be processed via at least one processing apparatus 12, such as a molding apparatus for molding a polyolefin part, at least one processing apparatus 12 for processing polyolefin particles, and the apparatus 1.

The apparatus 1 also enables implementing a method for conveying polyolefin particles from a first location L1 to a second location L2. The method comprises the steps of: generating, via a pressurizing unit 2, a particle conveying fluid stream, particularly comprising polyolefin particles in a pressurized fluid, the pressurized particle conveying fluid stream having a first pressure level; and decompressing, via a decompressing unit 3, the pressurized particle conveying fluid stream from the first pressure level to generate a decompressed particle conveying fluid stream having a second pressure level. The decompressing unit 3 used in the method comprises a first chamber 6 for receiving the pressurized particle conveying fluid stream, a second chamber 7 surrounding the first chamber 7, and optionally at least one dampening device 8 for dampening noise generated through decompression of the pressurized particle conveying fluid stream via the decompressing unit 3, wherein the first chamber 6 is delimited by a first wall structure 6.1 and the second chamber 7 is delimited by a second wall structure 7.1; wherein the first wall structure 6.1 comprises at least one first opening 6.1.1 through which an inner volume of the first chamber 6 is connected with an inner volume of the second chamber 7 and the second wall structure 7.1 comprises at least one second opening 7.1.1 through which the inner volume of the second chamber 7 is connected with at least one dampening device 8.

The invention claimed is:

1. An apparatus for conveying polyolefin particles, the apparatus comprising:

a pressurizing unit configured to generate a pressurized particle conveying fluid stream having a first pressure level; and a decompressing unit configured to decompress the pressurized particle conveying fluid stream from the first pressure level to generate a decompressed particle conveying fluid stream having a second pressure level, the second pressure level is lower than the first pressure level;

wherein the pressurized particle conveying fluid stream comprises polyolefin particles in a pressurized fluid, wherein the apparatus conveys polyolefin particles and the polyolefin particles are conveyed from the pressurizing unit to the decompressing unit, wherein the decompressing unit comprises:

a first chamber for receiving the pressurized particle conveying fluid stream and a second chamber surrounding the first chamber, wherein the first chamber is delimited by a first wall structure and the second chamber is delimited by a second wall structure, and wherein the first wall structure comprises at least one first opening through which an inner volume of the first chamber is connected with an inner volume of the second chamber and the second wall structure comprises at least one second opening through which the inner volume of the second chamber is connected to at least one dampening device.

2. The apparatus of claim 1, wherein the at least one dampening device is configured to dampen noise generated through decompression of the pressurized particle conveying fluid stream via the decompressing unit.

3. The apparatus of claim 1, wherein the first chamber comprises at least one inlet opening for the pressurized particle conveying fluid stream and at least one outlet opening for the decompressed particle conveying fluid stream, and wherein at least one inlet control device for controlling an amount of pressurized particle conveying fluid stream to enter the first chamber via the at least one inlet opening is assigned to the at least one inlet opening and at least one outlet control device for controlling an amount of decompressed particle conveying fluid stream and/or the amount of decompressed polyolefin particles to exit the first chamber via the at least one outlet opening is assigned to the at least one outlet opening.

4. The apparatus of claim 3, wherein the inlet control device is built as or comprises at least one valve device; and/or the outlet control device is built as or comprises at least one valve device.

5. The apparatus of claim 3, further comprising a control device for controlling operation of the at least one inlet control device and/or the at least one outlet control device.

6. The apparatus of claim 1, wherein the first wall structure delimiting the first chamber comprises a plurality of first openings forming a mesh or screen structure.

7. The apparatus of claim 1, wherein the at least one first opening has a varying cross-section, between an inlet portion through which a particle conveying fluid stream enters the at least one opening from the first chamber to an outlet portion through which a particle conveying fluid stream exits the at least one opening into the second chamber.

8. The apparatus of claim 1, wherein the decompressing unit has a hollow-cylindrical shape and comprises a plurality of dampening devices arranged at different positions relative to the circumferential extension of the decompressing unit and/or the longitudinal extension of the decompressing unit.

9. The apparatus of claim 1, wherein the decompressing unit has a hollow-cylindrical shape and comprises at least one group of at least two dampening devices located at a common longitudinal position but at different circumferential positions of the decompressing unit.

10. The apparatus of claim 1, further comprising a cleaning fluid stream generating unit for generating a pressurized cleaning fluid stream for cleaning the decompressing unit from residual polyolefin particles.

11. The apparatus of claim 1, wherein the first chamber and/or the second chamber is built from at least one duct- or pipe-element or comprises same.

12. The apparatus of claim 1, wherein the polyolefin particles comprise cellular polyolefin particles and/or foam polyolefin particles, and wherein the first pressure level is above 2 bar.

13. A system for processing polyolefin particles, comprising:

at least one storage apparatus for storing polyolefin particles to be processed via at least one processing apparatus;

at least one processing apparatus for processing polyolefin particles; and at least one conveying apparatus configured to create a pressurized particle conveying fluid stream comprising polyolefin particles in a pressurized fluid and to convey polyolefin particles in the pressurized particle conveying fluid stream from the at least one storage apparatus to the at least one processing apparatus;

wherein the pressurized particle conveying fluid stream comprises polyolefin particles in a pressurized fluid, wherein the apparatus conveys polyolefin particles and the polyolefin particles are conveyed from a pressurizing unit to a decompressing unit, wherein the polyolefin particles comprise cellular polyolefin particles and/or foam polyolefin particles, and wherein the conveying apparatus comprises:

a pressurizing unit for generating the pressurized particle conveying fluid stream comprising polyolefin particles in a pressurized fluid, the pressurized particle conveying fluid stream having a first pressure level;

a decompressing unit for decompressing the pressurized particle conveying fluid stream from the first pressure level to generate a decompressed particle conveying fluid stream having a second pressure level below the first pressure level; and a connecting line between the pressurizing unit and the decompressing unit so that the pressurized particle conveying fluid stream can flow from the pressurizing unit towards or into the decompressing unit, wherein the decompressing unit comprises:

a first chamber for receiving the pressurized particle conveying fluid stream and a second chamber surrounding the first chamber, wherein the first chamber is delimited by a first wall structure and the second chamber is delimited by a second wall structure, and wherein the first wall structure comprises at least one first opening through which an inner volume of the first chamber is connected with an inner volume of the second chamber.

14. A method for conveying polyolefin particles, comprising the steps of:

generating, via a pressurizing unit, a pressurized particle conveying fluid stream comprising the polyolefin particles in a pressurized fluid, the pressurized particle conveying fluid stream having a first pressure level, wherein the pressurized particle conveying fluid stream flows into a decompressing unit;

decompressing, via a decompressing unit, the pressurized particle conveying fluid stream from the first pressure level to generate a decompressed particle conveying fluid stream having a second pressure level, the second pressure level is lower than the first pressure level; and wherein the pressurized particle conveying fluid stream comprises polyolefin particles in a pressurized fluid;

wherein the apparatus conveys polyolefin particles and the pressurized particle conveying fluid stream is conveyed from the pressurizing unit to the processing apparatus, wherein the decompressing unit comprises:

a first chamber for receiving the pressurized particle conveying fluid stream and a second chamber surrounding the first chamber, wherein the first chamber is delimited by a first wall structure and the second chamber is delimited by a second wall structure; and wherein the first wall structure comprises at least one first opening through which an inner volume of the first chamber is connected with an inner volume of the second chamber.

15. The apparatus of claim 1, wherein the first pressure level is above 2 bar.

16. The apparatus of claim 2, wherein the at least one dampening device is an acoustic dampening device comprising a housing including a noise dampening structure.

17. The system of claim 13, wherein the second wall structure comprises at least one second opening through which the inner volume of the second chamber is connected with at least one dampening device.

18. The system of claim 13, wherein the at least one processing apparatus is an apparatus for post-processing polyolefin particles or for molding a polyolefin part.

19. The method of claim 14, wherein the decompressed particle conveying fluid stream conveys the polyolefin particles from the decompressing unit to the processing apparatus for processing the polyolefin particles.

20. The method of claim 14, further comprising dampening noise generated through decompression of the pressurized particle conveying fluid stream via the decompressing unit.

* * * * *